Aug. 27, 1963 W. JACKSON 3,102,235

AUTOMATIC RADIO WARNING SYSTEM

Filed Oct. 2, 1961 3 Sheets-Sheet 1

INVENTOR
WILBUR JACKSON

BY James H. Littlepage
ATTORNEY

INVENTOR
WILBUR JACKSON

BY James H. Littlepage
ATTORNEY

INVENTOR
WILBUR JACKSON
BY James H. Littlepage
ATTORNEY 3,102,235
Patented Aug. 27, 1963

3,102,235

AUTOMATIC RADIO WARNING SYSTEM

Wilbur Jackson, P.O. Box 286, Chatsworth, Ga.

Filed Oct. 2, 1961, Ser. No. 142,119
8 Claims. (Cl. 325—163)

This invention relates to an automatic alarm system utilizing a radio link to a reception center and, more particularly, a tone signal generator and control system therefor which will produce predetermined sequence of signals and perform certain control functions for a radio transmitter in response to actuation of one or more sensing devices.

The primary object of the invention is to provide a tone signal generator for modulating a radio transmitter and a control system which is triggered by a sensing device so as to render functional the radio transmitter, and simultaneously initiate a predetermine sequence of identifying tones, the sequence being carried through to completion even though the excitation of the sensing device be of extremely short duration. For example, if the sensor were a photoelectric device and if it were excited by only a momentary flicker of light, the tone sequencer would be triggered into an operating cycle which would continue through to completion, even though the original cause, i.e., the light flicker, had been transistory.

Another object is to provide a tone signal sequencer which is triggered into an operating cycle by one or more sensing devices, and to provide for the production of an identifiable and distinct sequence of cycles if the excitation of a sensing device continues. Thus, if only one sensing device be used, the central station can determine whether the excitation of the sensing device was momentary or whether it is of a continuing characteristic. If more than one sensing device be used in connection with the tone signal sequencer, and if the excitation of any one of the sensors be of continuing characteristic, the central station can identify the particular sensor being excited.

These and other objects of the invention will be apparent from the following specification and drawings, in which.

Figure 1:
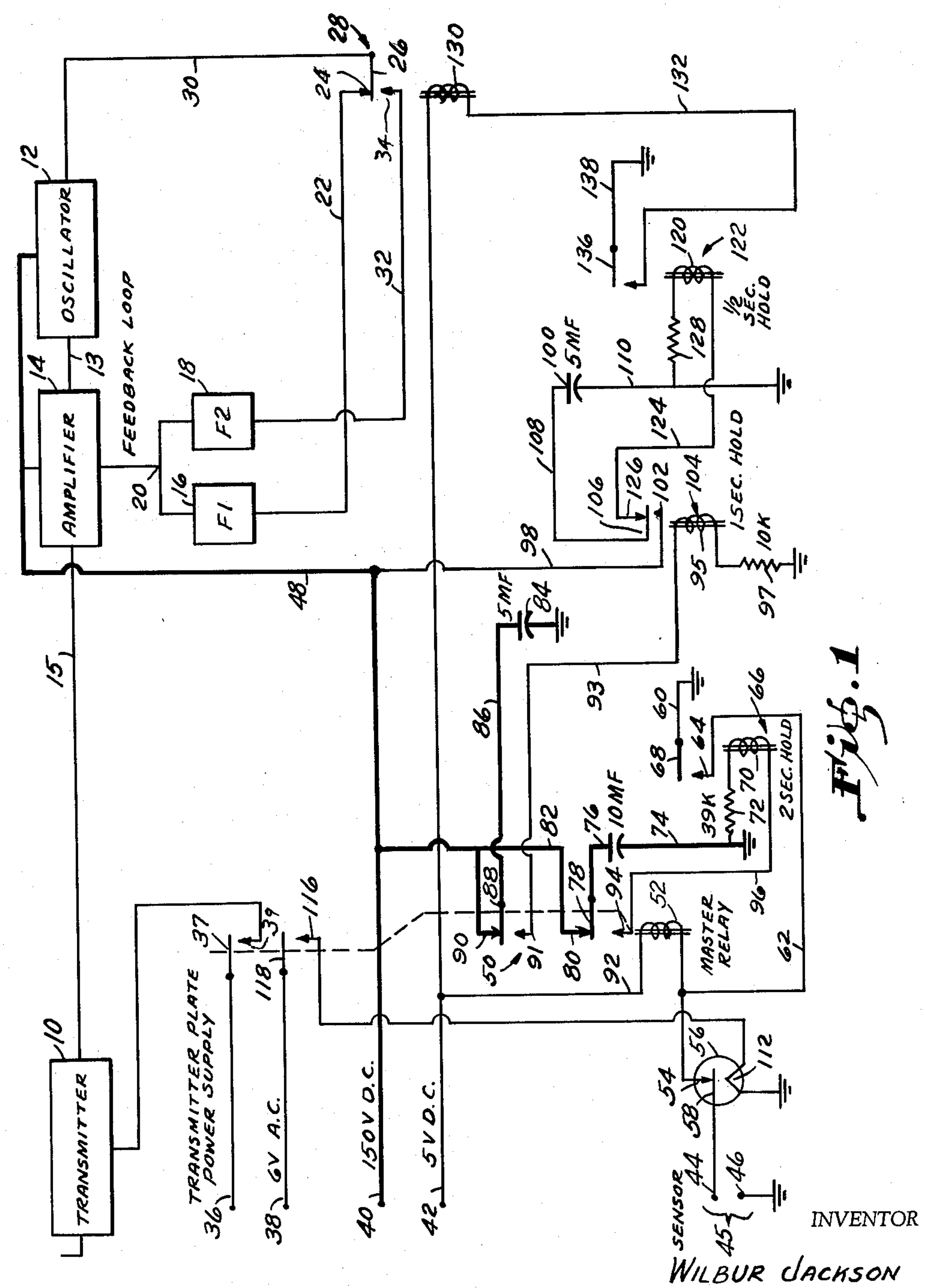
FIG. 1 is a simplified circuit diagram of a local radio transmitter, tone signal modulator, and tone signal sequencer, the active portions of the circuit in repose being denoted by heavy lines.

Referring now to the drawings, in which like reference numerals denote similar elements, a radio transmitter 10 is located in the region of the establishment to be protected or instruments to be monitored, for example, a building to be protected by a fire or burglary alarm system. It will be understood that the signals sent by transmitter 10 will be received and recorded at a central station, and that a number of transmitters 10 and their associated tone signal sequence controllers may be located at various regions around the central station.

Transmitter 10 is modulated by an oscillator 12 preferably connected as at 13, through an amplifier 14 and coupling 15 to the transmitter. In the system disclosed as an example, two different audible tones F1 and F2 are generated by means of networks 16 and 18 connected in a feedback loop 20 between amplifier 14 and oscillator 12. Feedback loop 20 alternatively includes a lead 22 running from F1 network 16 to a contact 24 normally engaged by the armature 26 of a double throw relay 28, the relay armature being connected, as indicated at 30, to oscillator 12. An alternative feedback path may be established through F2 network 18 via lead 32, contact 34 and armature 26 when relay 28 is energized. The details of the signal tone producing equipment are not important here, it being pertinent to note only that, so long as relay 28 is in one state, transmitter 10 is modulated by a signal F1, and when relay 28 is actuated to another state, the transmitter is modulated by a signal F2.

On the input side of the system, there are illustrated several leads essential to the understanding of the system. Transmitter 10 is left "ready" constantly, with its tube heater circuits, if any, closed. It does not go on the air, however, until its plate power is furnished via lead 36, armature 37 and contact 39 when a master relay 50, detailed below, is energized. The other input leads include a 6 volt A.C. line 38 which, through closed connections not shown, supplies current to the heaters of the tubes in the oscillator, amplifier and transmitter, and also through relay connections, detailed below, to the heater 112 of a thermal time delay relay 56. 150 volts D.C. is supplied via a lead 40 and branch 48 to provide plate power to the oscillator and amplifier, and, through other branches, to charge capacitors in relay holding circuits; 5 volts D.C. is supplied by lead 42 to actuate the power relays, and to provide voltage to contact 44 of a sensing device 45, the other contact 46 of which is grounded. Various types of sensing devices, responsive to heat, light, body capacity, pressure, instrument position or condition, etc. may be used, the significant characteristic being that whenever a circuit between contacts 44 and 46 is closed, a master relay 50 is actuated by the 5 volt D.C. circuit 92 running from lead 42 through master relay winding 52 and thence to a contact 54 in a thermostatic relay 56, contact 54 being normally engaged by a contactor 58 connected to sensor contact 44.

An energizing circuit for winding 52 of master relay 50 may also be completed to a ground lead 60 via a shunt circuit 62 connected to the contact 64 of a holding relay 66 whose armature 68 normally is disengaged from a contact 64. The winding 70 of holding relay 66 is connected through a 39K resistor 72 to ground, and also via lead 74 to a 10 mf. capacitor 76 which is charged through an armature 78 normally engaging a contact 80 of master relay 50. Contact 80 is connected via lead 82 to the 150 volt D.C. line 40 so that, during condition of circuit repose, when master relay 50 is not actuated, capacitor 76 becomes charged. Also, in the repose condition of the circuit, a 5 mf. capacitor 84 is charged via lead 86, master relay armature 88 and normally engaged contact 90 connected to lead 82. The active circuits of the system when the latter is in repose are denoted by the heavy lines in FIG. 1.

Figure 2:
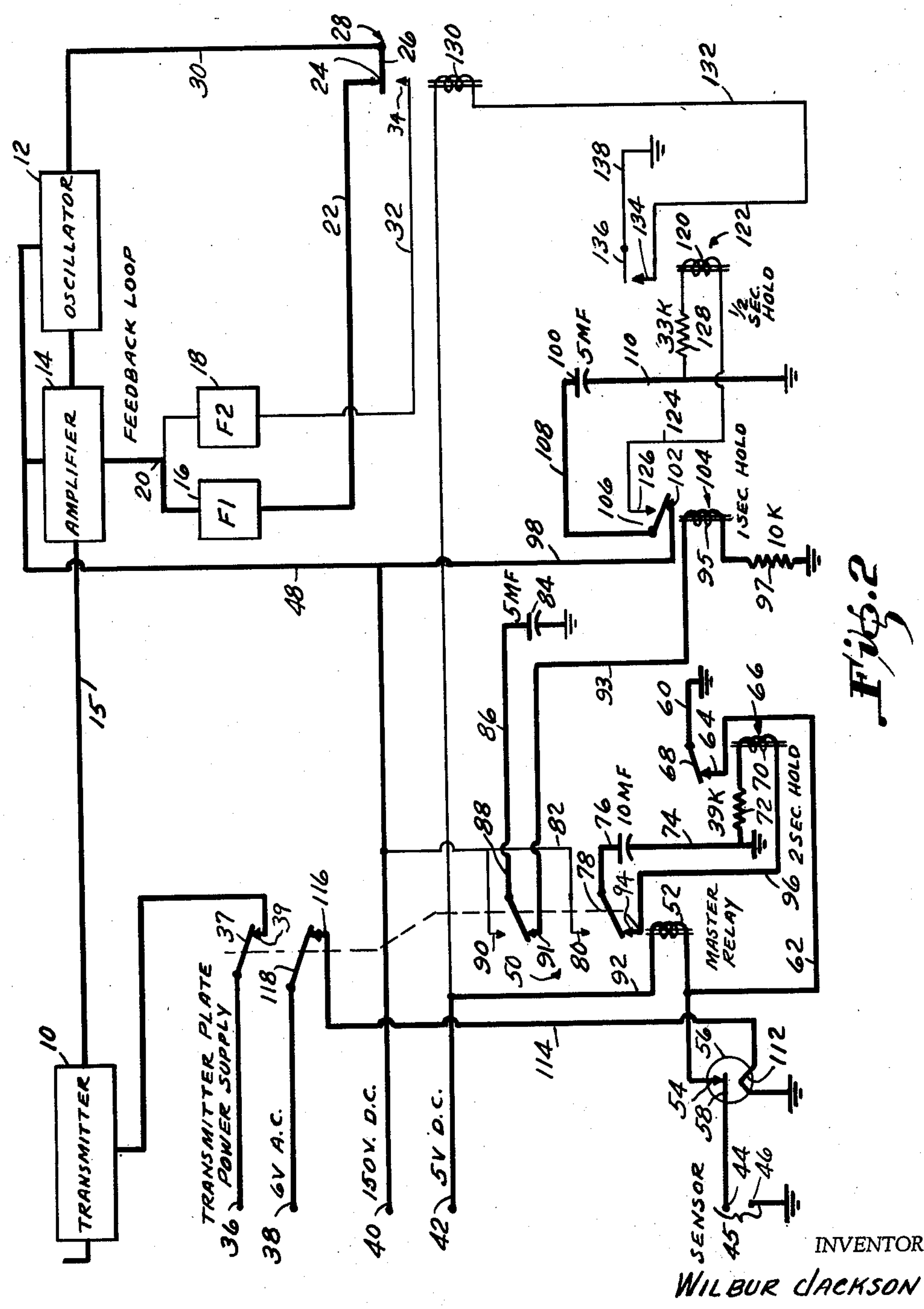
FIG. 2 is a circuit diagram similar to FIG. 1, but denoting in heavy lines the active portions of the circuit in first phase immediately following an excitation of the sensing device.

Referring now to FIG. 2, let it be assumed that sensor 45 is excited and a circuit is momentarily closed across contacts 44, 46. Winding 52 is energized by the 5 volt D.C. circuit 42, lead 92, the closed circuit through thermal time delay relay 56, sensor contact 44 and grounded contact 46. The sensor's exciting influence being transitory, relay 50 would ordinarily return immediately to its FIG. 1 state but for the holding circuit established through holding relay 66. When master relay winding 52 is energized, armature 78 pulls down against contact 94 and a holding circuit to winding 70 is established via lead 96, and maintained until capacitor 76 discharges through resistor 72 and winding 70. While the holding time for this circuit varied in accordance with the values selected for capacitor 76 and resistor 72 and the drop-out point for relay 66, the values selected for this example provide a hold time of approximately two seconds.

Actuation of master relay 50 also closes its armature 37 against contact 39, thereby putting transmitter 10 on the air. Also, capacitor 84 is then connected via lead 86 and armature 88 to master relay contact 91 and thence via lead 93 to the winding 95 of another holding relay 104. Capacitor 84 thus discharges through winding 95 and 10K resistor 97 and, in the present example, the values are chosen to provide a hold-closed time of between ½ second to 1 second.

While relay 104 holds its armature 106 closed against contact 102, a charging circuit is completed from the 150 volt supply line 40 via branch 98 to a 5 mf. capacitor 100, one side of the latter also being connected to ground via lead 110. The function of the charged capacitor 100 will be detailed later in connection with FIG. 3, it being pertinent to note now that while capacitor 84 discharges through holding relay 95, capacitor 100 simultaneously charges.

Figure 3:
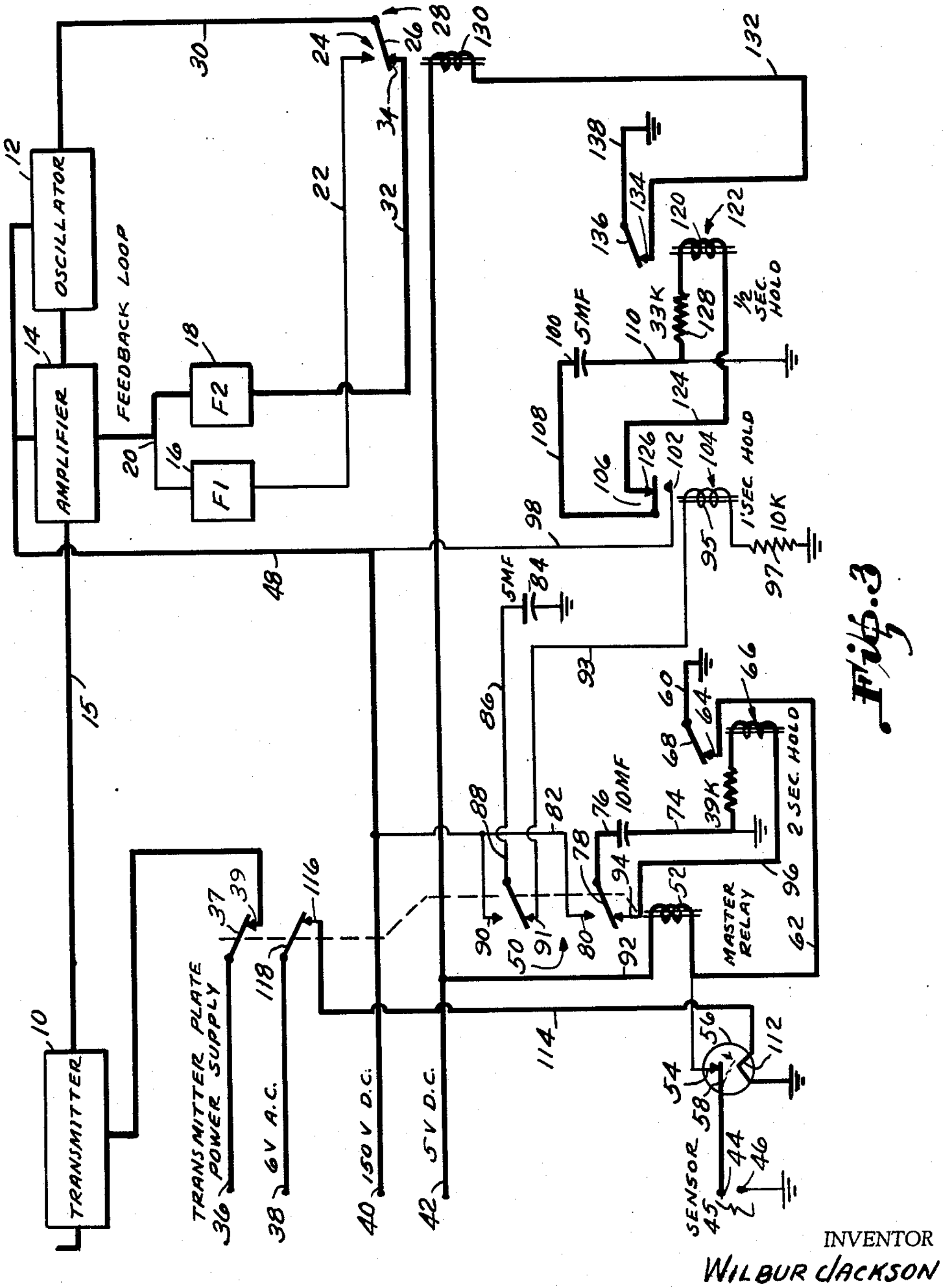
FIG. 3 is a diagram similar to FIG. 2, but denoting in heavy lines the active portions of the circuit in second phase.

Reverting to the lower left-hand portions of FIGS. 2 and 3. the heater 112 of thermal time delay relay 56 is connected on one side to ground, and on the other side via a lead 114 to a contact 116 on master relay 50 so that when the latter is energized, it pulls down the armature 118 which is connected to the 6 volt A.C. supply line, thereby starting heat to build up in relay 56.

The length of time required for relay armature 58 to warp away from contact 54 depends upon the characteristics of the particular relay. For the present example, let it be assumed that relay 56 will break the circuit at the end of five seconds of energization of its heater 112. As will subsequently be apparent, thermal time delay relay 56 comes into play only if the sensor contacts remain closed for a period longer than the opening time of the thermal time delay relay. It is important now to note that during the tone-sequencing operation of the remainder of the relay chain, heater 112 of the thermal time delay relay 56 is energized and building up heat.

After capacitor 84 discharges to ground through winding 95 and resistor 97, relay 104 lets go, thereby returning its armature 106 into contact 126, and completing a closed-circuit loop comprising winding 120 of relay 122, lead 124, contact 126, armature 106, lead 108, 5 mf. capacitor 100, lead 110 and the 33K resistor 128. The active circuits for this, the second phase of the cycle, are distinguished by the heavy lines in FIG. 3. Winding 130 of relay 28 is eenrgized during the hold time of relay 120 by the circuit running from the 5 volt D.C. line 42 through winding 130, lead 132, relay contact 134, armature 136 to ground through lead 138. When relay 120 closes, and so long as it holds, the feedback loop is shifted from F1 network 16 over to F2 network 18.

Assuming the hold time for relay 120 to be ½ second, the operating cycle following transitory closing of sensor contacts 44, 46 would be as follows.

First second:
- Master relay 50 closes, thereby—
  - Placing transmitter 10 on air with F1 modulator
  - Closing 2 second hold circuit of relay 66
  - Starting time delay cycle of relay 56
  - Closing 1 second hold circuit for relay 104 so as to energize hold circuit for relay 122

End of first second:
- Relay 104 lets go, thereby—
  - Closing energized hold circuit for relay 120, which
    - Closes energizing circuit for relay 28, which shifts feedback loop from F1 network 16 to F2 network 18

End of 1½ seconds:
- Relay 122 lets go, thus breaking energizing circuit for relay 28 and shifting feedback loop back to F1 network 16.

End of 2 seconds:
- Relay 66 lets go, thereby breaking hold circuit for master relay 50 and returning all circuits to state of repose.

If excitation of sensor contacts 45 is not transitory, and they remain closed:

From end of 2nd second to end of 5th second:
- Master relay 50 remains closed, holding transmitter 10 on air with steady F1 signal.

End of 5th second:
- Thermal time delay relay 56 opens, thereby—
  - De-energizing master relay 50 and returning all circuits to state of repose until thermal time delay relay 56 cools sufficiently so that contactor 58 re-engages contact 54.

Following 5th second:
- Circuit repeats F1—F2—F1 shifts and on air-off air cycles at intervals determined by warm-up, cool-off, and re-warm characteristics of thermal time delay relay 56.

It will thus be apparent that if a second sensor and thermal time delay relay is connected in parallel with sensor 45 and relay 56, and if the second relay has a time delay characteristic of, for example, eight seconds, the central station can determine which of the two sensors has closed contacts by recognition of the known time characteristics of the warm-up, cool-off and re-warm cycles of the time delay relays associated with the respective sensors.

Time delay relays other than of the thermal type may be used and, in addition to the elementary circuits described for purposes of illustrating the broad principles of operation, various manually closable shunt circuits may be connected around the relays for purposes of testing, indicating lamps may be used for visually denoting the conditions in the relay chain, and additional armatures and contact pairs may be added to the relays for establishing additional power supply circuits and circuits for adjusting the amplitudes of the signals of the networks in the feedback loop so that, in addition to tone differences, recognizable differences in amplitude of the transmitted tones may be established. Likewise, various types of tone generators, such as reeds or oscillators may be used and, if desired, only one tone generator corresponding to F1 generator 16 may be utilized for producing a single tone which will be interrupted for a predetermined period of silence during the interval in which relay 28 is energized.

The invention is not limited to the details disclosed and described herein, but is intended to cover all substitutions, modifications and equivalents within the scope of the following claims.

I claim:

1. In a condition-responsive signalling system, a radio transmitter link and a normally open power supply circuit therefor, a condition sensor including a pair of contacts, and tone signal generator means for modulating the transmitter, said generator means including first and second alternatively closable tone control circuits and an identifiable tone producing device in at least the first of said tone control circuits, a tone control relay actuatable between first and second states for alternatively closing said first and second tone control circuits upon energization and de-energiaztion of a winding thereof, a master relay including a winding, relay power supply circuit means, a cycle-initiating circuit connecting said sensor and the master relay for closing the relay power supply circuit means through the master relay winding upon closure of the sensor contacts whereby to energize the winding of the master relay and close the same, contact means on said master relay for closing the transmitter power supply circuit upon closure of the master relay, and slave relay means for cyclically closing and opening the relay power supply circuit means through the winding of the tone control relay in response to closure of the master relay.

2. The combination claimed in claim 1, and a normally closed time delay relay in said cycle-initiating circuit whereby to de-energize the master relay winding after a predetermined interval during which said sensor contacts remain closed.

3. The combination claimed in claim 2, said time delay relay being of the thermal type and having a heater, and circuit means including contacts on said master relay for connecting said heater with said relay power supply circuit means upon closure of master relay.

4. The combination claimed in claim 1, and hold circuit means connected to the winding of the master relay for holding the same closed for a predetermined holding interval following initial closure of the sensor contacts.

5. The combination claimed in claim 4, said hold circuit means including a holding relay having a winding, a capacitor chargeable for energizing the winding, and contact means on said master relay for establishing a charging circuit connecting the relay power supply circuit means with the capacitor in the open condition of the master relay and for connecting the capacitor across the winding of the holding relay in the closed condition of the master relay whereby to close and hold closed the holding relay during an interval while the capacitor discharges.

6. The combination claimed in claim 4, and a normally closed time-delay relay in said cycle-initiating circuit whereby to de-energize the master relay after a predetermined interval during which said sensor contacts remain closed, the holding interval of the hold circuit being less than the interval of the time-delay relay relay.

7. The combination claimed in claim 1, said slave relay means including a first slave relay having a winding and a first capacitor, contact means on said master relay for establishing a charging circuit connecting the relay power supply circuit means with the first capacitor in the open condition of the master relay and for connecting the first capacitor across the first slave relay winding in the closed condition of the master relay whereby to hold the first slave relay closed while the first capacitor discharges, a second slave relay having normally open contacts in series with the winding of the tone control relay, a winding and a second capacitor, contact means on said first slave relay establishing a charging circuit connecting the relay power supply circuit means with the second capacitor in the closed condition of the first slave relay and for connecting the second capacitor across the winding of the second slave relay when the first slave relay opens, thereby to close the power supply circuit means through the winding of the tone control relay and thereby shift the latter from the first state to the second state after a predetermined interval during which the first capacitor discharges, and to maintain said tone control relay in said second state for a predetermined interval during which the second capacitor discharges.

8. The combination claimed in claim 7, and hold circuit means connected to the winding of the master relay for holding the same closed for a predetermined holding interval following initial closure of the sensor contacts, the total of the two intervals during which the first and second capacitors discharge through their associated slave relay winding being less than the holding interval of the hold circuit means.

References Cited in the file of this patent

UNITED STATES PATENTS

| | | |
|---|---|---|
| 2,457,288 | Usselman | Dec. 28, 1948 |
| 2,623,991 | Fischler | Dec. 30, 1952 |
| 2,989,621 | Barton et al. | June 20, 1961 |